United States Patent [19]
Cadwell et al.

[11] Patent Number: 4,889,276
[45] Date of Patent: Dec. 26, 1989

[54] METHOD AND APPARATUS FOR FORMING AND BONDING METAL ASSEMBLIES

[75] Inventors: Gilbert C. Cadwell, Lakeside; Paul M. Phillips, San Diego, both of Calif.

[73] Assignee: Rohr Industries, Inc., Chula Vista, Calif.

[21] Appl. No.: 267,999

[22] Filed: Nov. 7, 1988

[51] Int. Cl.$^4$ ............................................. B23K 20/00
[52] U.S. Cl. ................................ 228/265; 228/118; 228/181; 228/237; 228/243; 228/15.1; 219/78.02; 219/78.11; 219/78.12; 219/385; 219/440
[58] Field of Search ............... 228/118, 181, 199, 212, 228/237, 243, 265, 15.1, 44.3; 219/78.02, 78.11, 78.12, 385, 440

[56] References Cited

U.S. PATENT DOCUMENTS

| | | | |
|---|---|---|---|
| 3,091,845 | 6/1963 | Herman et al. | 228/181 |
| 3,465,412 | 9/1969 | Hill | 228/181 |
| 3,651,240 | 3/1972 | Kirkpatrick | 219/78.02 |
| 4,029,254 | 6/1977 | Blair et al. | 228/243 |
| 4,087,037 | 5/1978 | Schier et al. | 228/15.1 |
| 4,231,507 | 11/1980 | Quinby | 228/243 |
| 4,392,602 | 7/1983 | Darby | 228/118 |
| 4,691,857 | 9/1987 | Friedman | 228/265 |

FOREIGN PATENT DOCUMENTS 1186436  10/1985  U.S.S.R. ............................. 228/181

*Primary Examiner*—Nicholas P. Godici
*Assistant Examiner*—Samuel M. Heinrich
*Attorney, Agent, or Firm*—Patrick J. Schlesinger; Frank D. Gilliam

[57] ABSTRACT

A method and apparatus for forming and bonding metal assemblies using an internally heated chamber. The parts can be both superplastic formed and diffusion bonded to other parts. A closable chamber contains a heating element near the chamber center. A ceramic die at least partially surrounding the heating element has a forming surface toward the heating element. The inner wall of the chamber is lined with a pressure bladder. A granular material, conical ceramic support, or extensible bladder fills the space between ceramic die and chamber inner wall. With the chamber closed, the heater is activated while an inert gas under pressure is introduced between heater and die and the bladder if used is pressurized. The bladder or packed granules support the outer die surface while the gas pressure presses metal parts on the die forming surface against the die. The metal parts are formed and bonded together by the substantially isostatic forces thereon. The heat is concentrated on the parts, leaving the chamber walls cold. When forming is complete, the chamber interior is cooled and the die is removed and broken away from the formed assembly. Parts can be formed and bonded rapidly with a considerable energy saving over conventional isostatic pressing ovens.

16 Claims, 4 Drawing Sheets

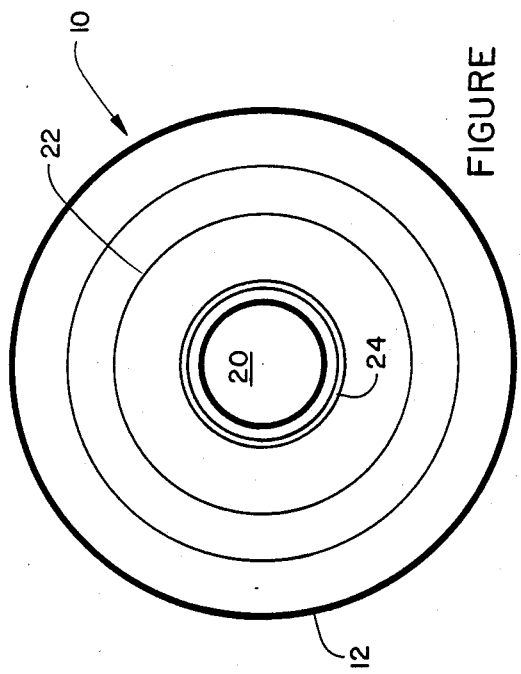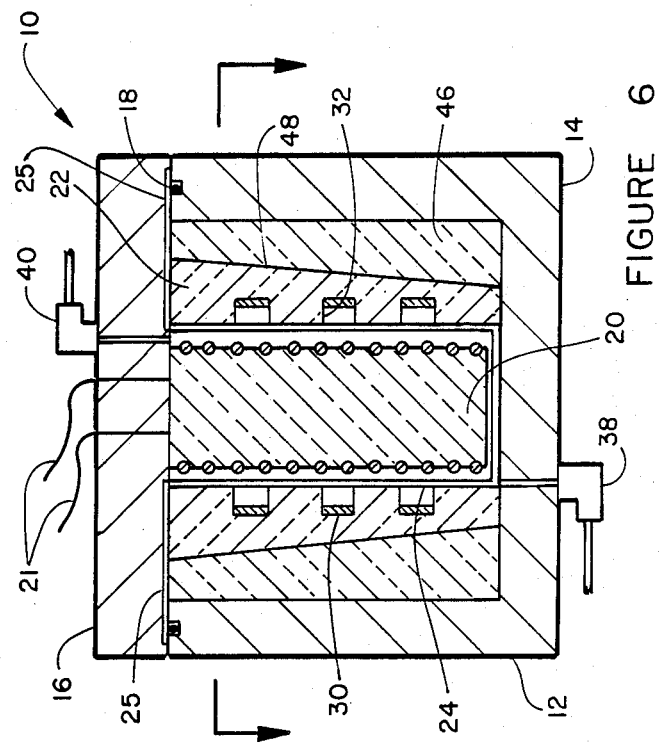

METHOD AND APPARATUS FOR FORMING AND BONDING METAL ASSEMBLIES

BACKGROUND OF THE INVENTION

This invention involves the shaping and bonding of metal assemblies by pressing at high temperatures. More specifically, this invention relates to a press assembly and method of isostatic pressing in a cold chamber.

Hot isostatic pressing, as exemplified by U.S. Pat. No. 3,739,617 to Stejskal, basically involves preparing an assembly of metal parts, powdered metal, etc., on a forming surface, covering the assembly with a flexible blanket or deformable bag and placing the assembly in an autoclave at high temperature and pressure to form and bond the assembly.

This is a very effective manufacturing technique for a variety of materials and assemblies. However, this method is difficult to use with parts that cannot be pressed with a simple bag and is often wasteful of energy where a large autoclave must be heated to press a small volume of assemblies. Complex, flexible, sheet metal housing have been designed for forming and bonding complex shapes by hot isostatic pressing. Typical are those described by Borchert et al in U.S. Pat. No. 4,575,327. These housing and the pressure transmitting components are expensive and difficult to design for proper assembly and disassembly without interference either before and after pressing.

Attempts have been made to use granular materials, such as is shown by Rigby et al in U.S. Pat. No. 4,552,710 or molten glass (Schilling et al, U.S. Pat. No. 4,183,456) as the pressure transmitting medium for complex shapes. Pressure is often not entirely isostatic and removing the material after pressing is often difficult and the material may adversely react with the assembly materials when brought into contact with them at high temperatures.

Expandable bags, as shown, for example by Schwarzkopf in U.S. Pat. No. 3,922,127, and materials with a high coefficient of thermal expansion as taught by Horn et al, U.S. Pat. No. 3,795,559, have been used to apply pressure to complex areas of an assembly. These techniques have been generally limited to low melting metals and low temperature fabrication of fiber reinforced synthetic resin matrix materials.

Therefore, there continues to exist an unmet need for methods and apparatus for forming and/or bonding metal parts at high temperatures which permit the use of complex tooling while having lower heating energy requirements.

SUMMARY OF THE INVENTION

The problems noted above are overcome by my high temperature shaping and bonding apparatus which is internally heated and uses a combination of an expendable ceramic shaping surface and gas pressure to apply the required shaping and bonding pressure. For the purposes of this application "forming" or "metal forming" will be understood to include reshaping metal parts, such as by superplastic deforming, bonding of metal parts together by diffusion bonding or any combination of such shaping and bonding.

Basically, the apparatus includes a chamber having walls (often cylindrical) and a floor, closable by a lid which is sealable against the upper wall edges. A heating element is positioned with the chamber. Where a tubular article (or a group of articles which can be arranged in a generally tubular configuration) is to be formed, a tubular expendable ceramic shell die surrounds the heating element with the forming surface towards the heating element.

In one embodiment, a reusable pressure bladder is placed against the inner wall of the chamber. The bladder is adapted to expand inwardly towards the ceramic die when pressurized. The outside surface of the ceramic die must be a smooth cylinder or cone.

In a second embodiment a quantity of metal or ceramic particles fills the volume between the frangible die and the pressure chamber inner wall. The outer surface of the frangible die can be thin, irregular and the lest costly die now available.

In a third embodiment an ceramic support is used having an exterior wall matching the chamber interior and an inverted frusto-conical inner wall matching a conical outer wall of the die, so that the support can be placed in the pressure chamber and the die inserted tightly there into.

If desired, a solid ceramic tubular support for the die, having an inner surface corresponding precisely to the outer surface of the die, may be slipped over the die. This support permits the segmented dies or the expendable die to be thinner and less expensive and has other advantages as discussed below.

In use, the heater, die with metal parts to be formed in place on the inside surface, bladder or fill particles are all placed in the chamber and the lid is placed on the chamber and sealed thereto by an O-ring. A tube penetrating the chamber is used to evacuate air therefrom, after which an inert gas is introduced inside the die to a selected pressure while the bladder if used is pressurized to help balance the expansion of the die. The heater is activated and the inside of the die is brought to the proper metal forming temperature and pressure for the metals being used.

Only the center of the chamber is heated, greatly reducing energy consumption when compared to the usual method in which the chamber would be heated through its exterior by placing it in a large heated autoclave or oven. The time required for a metal forming cycle is also greatly reduced, since only a small volume within the chamber need be heated to the metal forming temperature.

While three dimensional parts are formed, that is, shaped and bonded, the part or parts are only shaped relative to a single axis so only effectively two-dimensional or tubular shaping occurs.

BRIEF DESCRIPTION OF THE DRAWING

The invention and certain preferred embodiments thereof will be further understood upon reference to the drawing, wherein:

FIG. 5 is a plan view of a third embodiment of the assembled chamber with the cover removed, using a close fitting conical ceramic die support means;

FIG. 6 is a vertical section view of the embodiment of FIG. 5, with the cover in place, taken on line 6—6 in FIG. 5;

DESCRIPTION OF PREFERRED EMBODIMENTS

Figure 1:
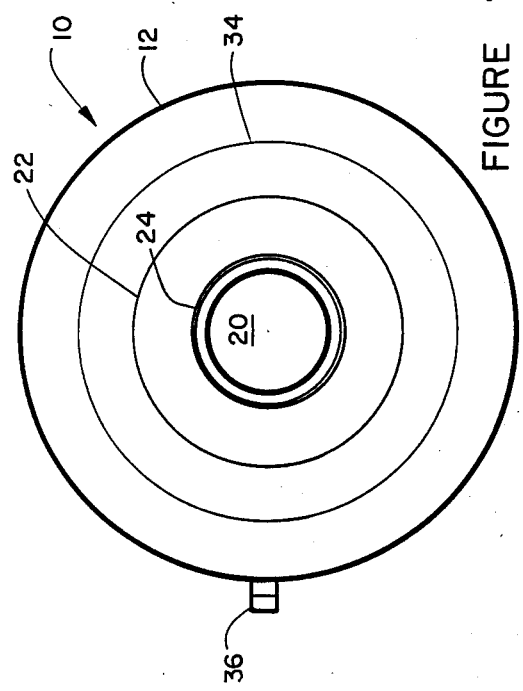
FIG. 1 is a plan view of a first embodiment of the assembled chamber using granular die support means; with the lid removed.
Figure 2:
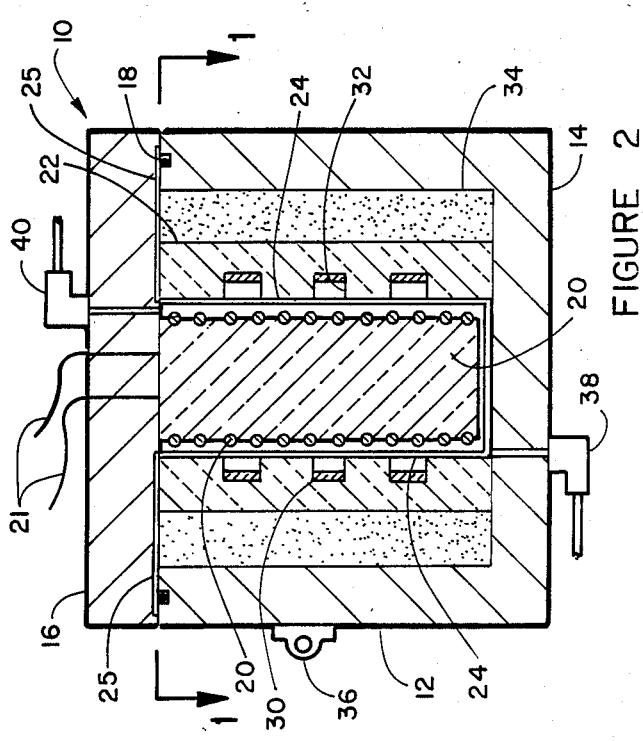
FIG. 2 is a vertical section view of the embodiment of FIG. 1 with the lid in place, taken on line 2—2 in FIG. 1.

Considering FIGS. 1 and 2 together, there is seen a chamber 10 having a side wall 12 (in this case, a cylindrical ring shape) a bottom wall 14 and a lid 16. A conventional seal 18, such as an O-ring, is interposed between lid 16 and the upper edge of wall 12.

Centrally located within chamber 10 is a heater 20 which may typically be a resistance heater, an induction heater or any other suitable type of heater. Heater 20 consisting of resistance heating wires wound on a ceramic tubular support, connected to a power source through wires 21.

A ceramic, frangible die 22 surrounds heater 20. The inside surface of die 22 is configured to correspond to the outside surface of the metal part or parts to be formed. In the embodiment shown, the assembly includes a tube 24, and a plurality of rings 30 lying in circumferential grooves 32 (as seen in FIG. 2). Tube 24 preferably has wide flange 25 at the top which extends out past O-ring 18 for more effective sealing and may have a closed bottom, forming a wide-rimmed cup-like configuration. In this case, it is desired to superplastic form tube 24 to the precise inside dimension of die 22 while at the same time diffusion bonding rings 30 to tube 24. Of course, rather than shaping one complete ring, different discrete pieces or separate subassemblies could be separately formed at different locations along the interior of a die 22.

Any suitable frangible ceramic material may be used for die 22. Typical materials include alumina, and fused silica.

While die 22 may be made sufficiently thick to resist the stresses of the forming and bonding action, in many cases it is preferred that die 22 be made fairly thin and have a supporting ring of compacted particles 34 surrounding die 22. Particles 34 could have any suitable composition, such as *alumina titania* or *fused silica*. Suitable metal particles could be used if desired, although this increases heat transfer to the chamber walls.

As detailed below, after the forming operation is complete, and the assembly is cooled, and is extracted from the compacted particles, then die 22 is fractured to remove the formed and bonded part. Where only a single, thick, die 22 is used, more material is expended and sometimes the part may be damaged in fracturing the thicker die. Also, die 22 may be constructed of several independent pieces which fit together to give the tube-like configuration. Ordinarily, the parts of such a die will be separated; that is by lines or planes extending generally outwardly from the axis of the die which could form several independent parts. Then, die 22 can be more easily disassembled after the forming operation, reducing or eliminating damage to the part or parts during die fracturing.

A tube 38 connecting with the center of chamber 10 is provided to permit the chamber to be evacuated and purged with Argon before heating, to reduce or eliminate oxidation of the metals at the high temperatures used. Also, a tube 40 is provided for introducing an inert gas, such as argon, under the forming pressure. While one tube could be used for both evacuation and pressurization with suitable valving, in general separate air evacuation and inert gas pressurization systems are preferred.

For shaping and bonding in accordance with the invention, initially a suitable chamber 10 is prepared. The metal pieces 30 to be formed are placed on the inside surface of die 22 and held in place, if necessary by any suitable method, such as tack welding. Die 22 is placed in chamber 10. The space between die 22 and the inner wall of chamber 12 is filled with particulate material 34. Lid 16 carrying heater 20 is put in place and sealed to wall 12 by O-ring 18. The interior is flushed with argon and evacuated through tube 38. Heater 20 is turned on and the metal parts are heated to the selected temperature, typically 1650° F. The inside of the die is pressurized through tube 40, typically to about 300 psig.

When the desired forming period is complete, the heater is turned off and the assembly is allowed to cool. Pressure is released in the die, the lid is removed and the die is removed. The die is removed from the formed part and the process is complete.

Figure 3:
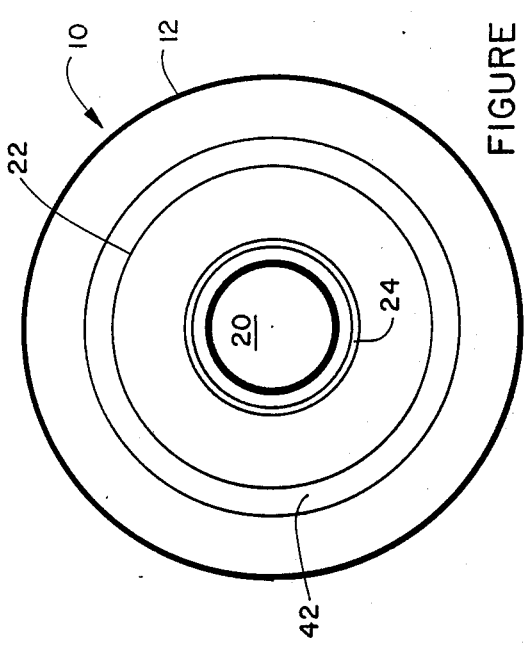
FIG. 3 is a plan view of a second embodiment of the assembled chamber with the cover removed using an expansible bladder to support the forming die.
Figure 4:
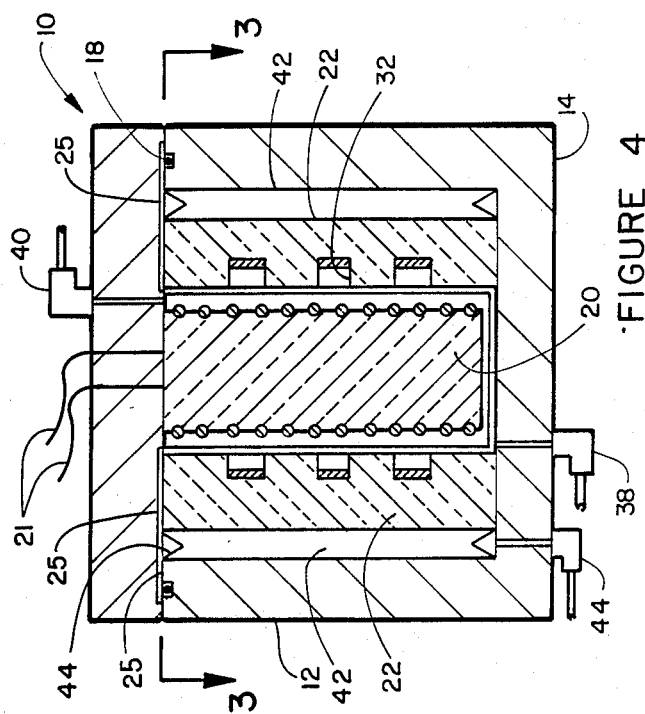
FIG. 4 is a vertical section view of the embodiment of FIG. 3, with the cover in place, taken on line 4—4 in FIG. 3.

In a second embodiment shown in FIGS. 3 and 4, a pressure bladder 42 is used in place of the particulate material 34 of the embodiment of FIGS. 1 and 2 to support the exterior surface of die 22. The outer components are the same as in the first embodiment. Here, bladder 42 basically consists of inner and outer tubular sleeves connected by pleats 44 which permit inward expansion of the bladder. After bladder 42, die 22, tube 24 and heater 20 are installed, bladder 42 is pressurized through line 44 to help die 22 overcome the forces of the interior pressurizing gas. The assembly is heated and pressurized, then disassembled as discussed above. The bladder approach has advantages in selective pressurization of the outer wall of die 22, often allowing use of thinner dies, and limits heat transfer from the die to the inner wall of chamber 22.

The third embodiment shown in FIGS. 5 and 6 is basically similar to those shown in the earlier Figures, with the exception that a conical ceramic die holder 46, which mates with a corresponding conical surface 48 on the exterior of die 22 is used to support die 22 during forming. The outside wall of die holder 46 fits the interior wall of chamber 12. In this case, die holder 46 is placed in chamber 12, then die 22 is tightly wedged therein. Heating and pressurization are accomplished as discussed above. Upon completion of the forming steps, lid 16 is removed and then the die is removed from the chamber. Die 22 is carefully extracted from die holder 46 which is reusable. While it would be possible to simply use a die 22 having an exterior sized to fit directly within chamber 12, such a large die has been found to be very difficult to remove from the fabricated part without damaging the part. Also, this would be very wasteful of die material. In this embodiment, die 22 may be relatively thin, permitting easy removal from the part. For long production runs, this embodiment has advantages in very uniform support of the die and reusability of the die holder, while for short runs the embodiment shown in FIGS. 1 and 2 has the advantage of obviating the need for forming precisely matching conical surfaces on the die/dieholder mating surfaces although possibly providing less uniform support for the die.

Figure 7:
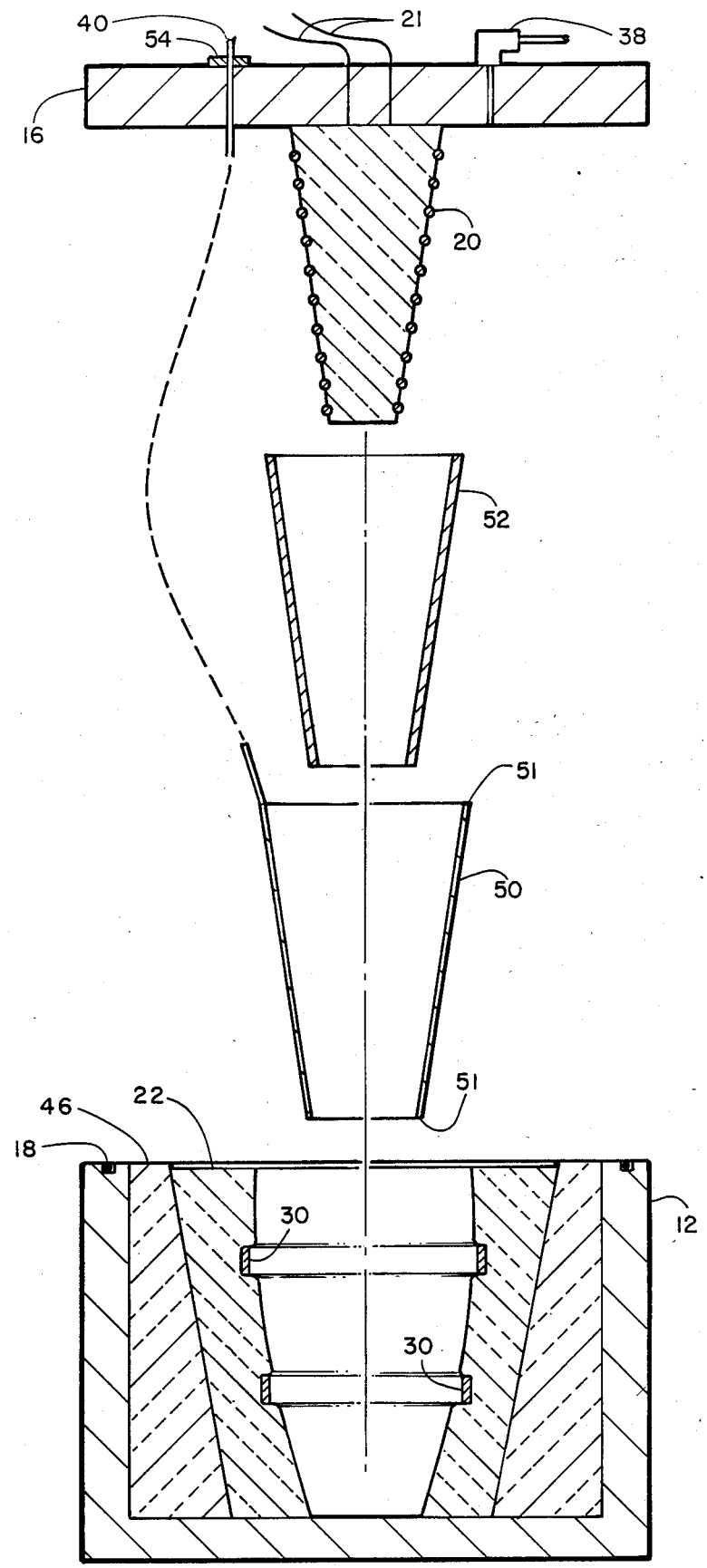
FIG. 7 is a schematic exploded view of a fourth embodiment, shown in vertical axial section.

FIG. 7 illustrates an embodiment in which double-walled parts may be formed and bonded to other components. Chamber 12, cover 16, heater 20 (although frusto-conical rather than cylindrical), die 22 and die support 46 are basically the same as in the embodiment of FIG. 5 and 6, discussed above. Here part blank 50 is in the form of two slightly spaced conical sheets with their edges sealed together, such as by welding beads 51. A pressurizing gas is introduced through tube 40 into the space between the halves of blank 50.

In the forming process, die support 46 and die 22 are installed in chamber 12. Of course, the outer wall of die 22 could be cylindrical and the supports shown in FIGS. 1–4 could be used, if desired. Dual-wall part blank 50 is placed, followed by interior forming support 52 which is made from any material having suitable strength and which will not bond to part 50 during forming, typically high temperature stainless steels having the designation 22-4-9 or RA 330. Lid 16 with heater 20 is lowered into place, with tube 40 sliding through the hole in lid 16. Cover 16 is placed on and locked to chamber 12. The interior of the chamber is purged with Argon through tube 38. Upon heating and pressurization of the part blank 50, the interior blank wall remains in contact with forming support 52 while the outer blank wall expands into contact with rings 30 and diffusion bonds thereto. Pressure is released, the assembly is cooled, the cover and heater are removed and the formed part is removed with die 22. The die is broken away, leaving the hollow-walled part with a smooth conical interior wall and an outside wall reinforced by rings 30.

Figure 8A:
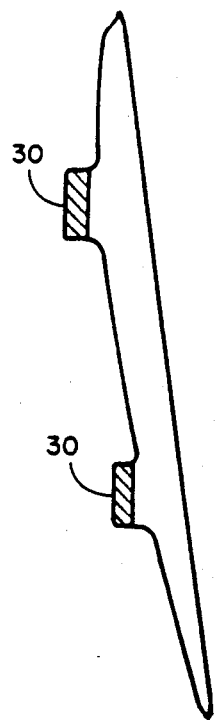
FIG. 8 is an enlarged detail of a single wall assembly.
Figure 8B:
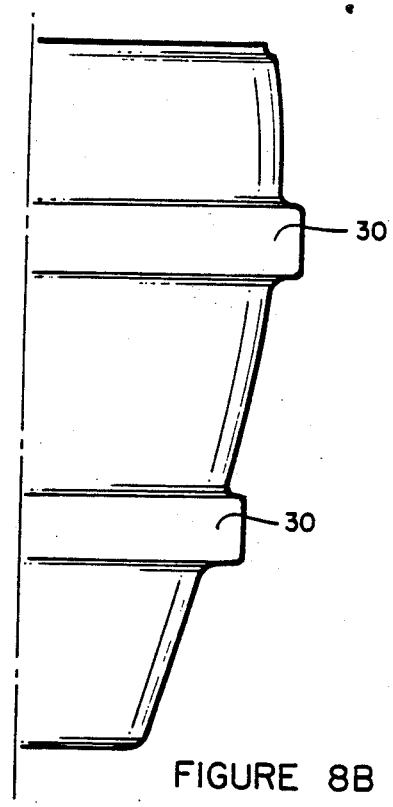

FIG. 8 depicts a single wall part cylinder cone which can be super plastic formed (SPF) or a can be formed by a combination of SPF and diffusion bonding (DB) by trimming off the inside cylinder or cone. The inside cylinder or cone can be reused by welding to the next part blank and repeating the forming or bonding cycle.

Figure 9A:
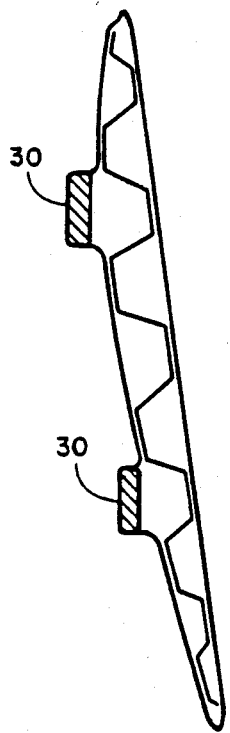
FIG. 9 is an enlarged detailed showing of a double wall part will internal stiffeners.
Figure 9B:
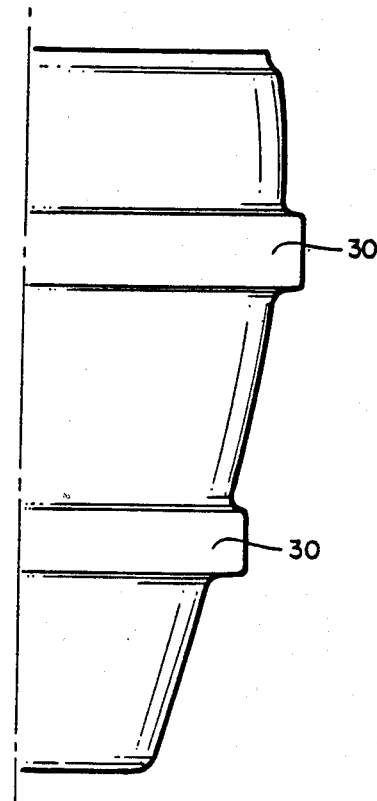

FIG. 9 depicts a double wall part with internal stiffeners that can be SDF/DB by placing a stop-off pattern on both sides of the center sheet and sandwiching the center sheet between two skins and weld around the periphery with a gas forming tube attached. After elevating the temperature of the assembly, to 1650° to 1700° F. the forming chamber is pressurized to 300 psi. This will bond the outer skins to the center sheet. The pressure in the chamber is then released and the assembly is then pressurized internally forming the DB rings or other parts.

While the above description of preferred embodiments specified certain dimension, arrangements and materials, these can be varied, where suitable, with similar results. For example, if diffusion bonding of parts without superplastic forming is desired, pressurizing the interior of die 22 may not be necessary and the process could take place with a vacuum in the die.

I claim:

1. An apparatus for forming metal assemblies which comprises:
    a chamber having walls, a floor and a removable cover;
    a heating element centrally located in said chamber;
    a ceramic die at least partially surrounding said heating element and having a forming surface on a first side extending toward said heating element and adapted to receive metal parts for forming and bonding;
    die support means in contact with the chamber interior walls filling the space between a second side of said die and said interior chamber walls; and
    means to permit evacuation of gases from, and introduction of high pressure gases into, the space between said heating element and said die.

2. The apparatus according to claim 1 wherein said die support means comprises a quantity of granular material substantially filling the space between said die and said interior chamber walls.

3. The apparatus according to claim 1 wherein said die support means comprises an expandable bladder substantially filling the space between said die and said interior chamber walls and further including means for introducing high pressure gas into said bladder to apply uniform pressure against said die.

4. The apparatus according to claim 1 wherein said die support means comprises a ceramic support ring having an external configuration corresponding to the internal configuration of said chamber walls and an internal configuration corresponding to the external configuration of said die and adapted to fit over said die and substantially fill the space between said die and said interior chamber walls.

5. The apparatus according to claim 4 wherein the interface between said die and said ceramic support ring is frusto-conical in shape.

6. The apparatus according to claim 1 wherein said die is made up of a plurality of radial components which form said tubular die when assembled.

7. The apparatus according to claim 1 wherein said heater is a resistance or induction heater.

8. The apparatus according to claim 1 wherein said die is formed from alumina or fused silica.

9. The apparatus according to claim 1 further including a second die between the forming surface of said first die and said heater, said second die having a second forming surface juxtaposed with said first forming surface, whereby a hollow part may be placed therebetween, said apparatus further including means for introducing high pressure gases into said hollow part to expand said part toward both forming surfaces.

10. The method of forming a metal assembly which comprises the steps of:
    providing a chamber having a floor, walls and a removable cover;
    placing in said chamber a hollow, generally tubular, ceramic die having a forming surface on a first side extending toward said heating element;
    placing an interior forming support within said ceramic die;
    inserting metal parts together between said ceramic die and said interior forming support;
    filing the space between the interior walls of said chamber and the second side of said die with a die support means;
    placing a heater within said die;
    sealing said cover to said housing;
    purging air from within said housing;
    introducing a high pressure inert gas into said chamber; and
    activating said heater to heat said metal assembly;
    whereby said metal parts are bonded together and formed to the die forming surface.

11. The method according to claim 10 including the further steps of cooling said metal assembly, removing said die and metal assembly from said chamber and breaking said die into pieces and separating the pieces from said metal assembly.

12. The method according to claim 10 wherein said space between said die and said chamber walls is filled by pouring a granular high temperature resistant material thereinto and compacting the granular material to substantially fill that space.

13. The method according to claim 10 wherein said space between said die and said chamber walls is filled by inserting therebetween an expandable bladder and introducing high pressure gas into said bladder to uniformly press against the second side of said die.

14. The method according to claim 10 wherein said space between said die and said chamber walls is filled by slipping a ceramic support member over said die, the internal configuration of said support member closely matching the external configuration of said die and the external configuration of said support member closely matching the internal configuration of said chamber walls, and inserting the assembly of said die and said die support member into said chamber.

15. The method according to claim 14 where in the interface between said die and said support member is frusto-conical in configuration.

16. The method according to claim 10 wherein at least one of said metal parts is hollow and further including the steps of providing a second die between said metal parts and said heater and said second die having a forming surface directed toward said metal parts and introducing high pressure gas into said hollow part during said heating step to force areas of said part against both first and second die forming surfaces.

* * * * *